US007171514B2

(12) United States Patent
Coronado et al.

(10) Patent No.: US 7,171,514 B2
(45) Date of Patent: Jan. 30, 2007

(54) APPARATUS AND METHOD TO CONTROL ACCESS TO LOGICAL VOLUMES USING PARALLEL ACCESS VOLUMES

(75) Inventors: Juan A. Coronado, Tucson, AZ (US); Matthew J. Kalos, Tucson, AZ (US); Donald M. Nordahl, Tucson, AZ (US); Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/719,486

(22) Filed: Nov. 20, 2003

(65) Prior Publication Data

US 2005/0114591 A1 May 26, 2005

(51) Int. Cl.
*G06F 12/00* (2006.01)

(52) U.S. Cl. ..................................... 711/112
(58) Field of Classification Search ................ 711/112, 711/114
See application file for complete search history.

(56) References Cited

U.S. PATENT DOCUMENTS

| 5,970,030 | A |   | 10/1999 | Dimitri et al. ............ 369/36 |
| 6,115,772 | A | * | 9/2000  | Crater ...................... 710/306 |
| 6,167,459 | A | * | 12/2000 | Beardsley et al. ........... 710/3 |
| 6,269,423 | B1 |  | 7/2001  | Kishi ....................... 711/113 |
| 6,438,648 | B1 | * | 8/2002  | McKean et al. ............ 711/114 |
| 6,633,962 | B1 | * | 10/2003 | Burton et al. ............... 711/163 |
| 6,799,255 | B1 | * | 9/2004  | Blumenau et al. .......... 711/152 |
| 2002/0069307 | A1 | * | 6/2002 | Fairchild et al. ............ 710/5 |
| 2003/0014600 | A1 | * | 1/2003 | Ito et al. .................... 711/152 |
| 2003/0131193 | A1 | * | 7/2003 | Kodama et al. ............ 711/114 |
| 2003/0172239 | A1 | * | 9/2003 | Swank ...................... 711/163 |
| 2003/0233518 | A1 | * | 12/2003 | Yamagami et al. ......... 711/114 |
| 2004/0123180 | A1 | * | 6/2004 | Soejima et al. .............. 714/5 |

\* cited by examiner

*Primary Examiner*—Matthew Kim
*Assistant Examiner*—Ryan A. Dare
(74) *Attorney, Agent, or Firm*—Dale F. Regelman

(57) ABSTRACT

A method to control access to logical volumes disposed in an information storage and retrieval system using parallel access volumes. The method provides an information storage and retrieval system comprising a plurality of logical volumes, and a plurality of host computers, where each host computers is capable of communicating with the information storage and retrieval system. The method creates a parallel access volume having an alias, and persistently associates that parallel access volume with an original base logical volume, where the original base logical volume may be assigned to one of (N) logical volume groups. If the original base logical volume is assigned to the (i)th logical volume group, the method permits each host computers assigned to the (i)th host computer group to access the original base logical volume, or the current base logical volume, associated with the parallel access volume.

9 Claims, 9 Drawing Sheets

US 7,171,514 B2

APPARATUS AND METHOD TO CONTROL ACCESS TO LOGICAL VOLUMES USING PARALLEL ACCESS VOLUMES

FIELD OF THE INVENTION

The invention relates to an apparatus and method to control access to logical volumes disposed in an information storage and retrieval system when using Parallel Access Volumes.

BACKGROUND OF THE INVENTION

In hierarchical computer storage systems, fast and intensively used storage are paired with arrays of slower and less frequently accessed data devices. One example of high-speed, expensive memory is a direct access storage device file buffer (DASD). Slower storage devices include tape drives and disk drive arrays. Such tape drives and/or disk drive arrays are often located in an information storage and retrieval system, sometimes referred to as an automated media storage library.

Information storage and retrieval systems are known for providing cost effective access to large quantities of stored information, such as backup computer files. Generally, such information storage and retrieval systems include information storage media, such as a plurality of tape cartridges, a plurality of optical cartridges, a plurality of disk arrays, a plurality of electronic storage media, and the like. By electronic storage media, Applicants mean a device such as a PROM, EPROM, EEPROM, Flash PROM, and the like. A number of different companies manufacture automated media storage libraries today, each model displaying various different features. One example is the IBM TotalStorage® Enterprise Storage Server.

Storage area networks (SANs) are dedicated networks that connect one or more hosts or servers to storage devices and subsystems, such as an automated media library. SANs may utilize an appliance, such as a networked attached storage device ("NASD") to provide for management of the SAN.

What is needed is a method to control access to logical volumes disposed in an information storage and retrieval system when using parallel access volumes, where multiple host computers owned by differing persons have access rights to one or more of those logical volumes.

SUMMARY OF THE INVENTION

Applicants' invention includes an apparatus and method to control access to logical volumes disposed in an information storage and retrieval system when using parallel access volumes. The method provides an information storage and retrieval system comprising a plurality of logical volumes, and a plurality of host computers, where each host computers is capable of communicating with the information storage and retrieval system.

The method forms (N) host computer groups, and assigns each host computer to one of the (N) host computer groups, such that each host computers is only assigned to one host computer group. The method forms (N) logical volume groups, and assigns all or some of the logical volumes to a logical volume group, such that each of the assigned logical volumes is only assigned to one logical volume group.

The method creates a parallel access volume having an alias, and persistently associates that parallel access volume with an original base logical volume, where the original base logical volume is assigned to one of the logical volume groups, i.e. the (i)th logical volume group, or is unassigned. If the base logical volume is assigned to the (i)th logical volume group, the method permits each host computers assigned to the (i)th host computer group to access the original base logical volume, or the current base logical volume, associated with the parallel access volume.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the Figures.

Figure 2A:
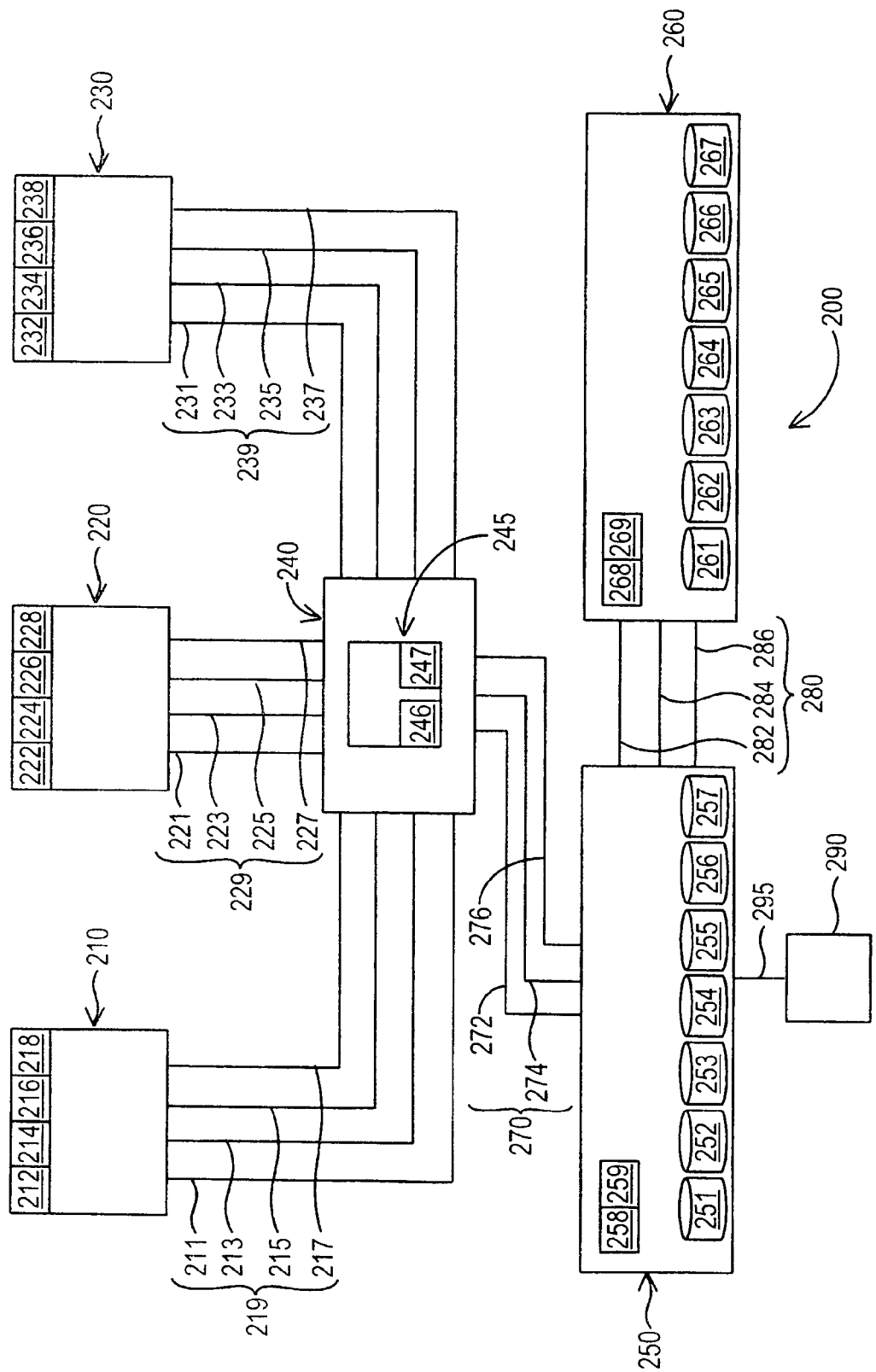
FIG. 2 is a block diagram Applicants' data processing system.

FIG. 2A shows one embodiment of Applicants' data processing system. In the illustrated embodiment of FIG. 2A, system 200 includes a first host computer 210, a second host computer 220, and a third host computer 230. Each of the first, second, and third host computers is interconnected with a storage area network ("SAN") 240. SAN 240 is interconnected with information storage and retrieval system 250.

System 200 further includes configuration interface 290. In certain embodiments, configuration interface 290 is integral with information storage and retrieval system 250. In the illustrated embodiment of FIGS. 2A and 2B, configuration interface 290 is interconnected with information storage and retrieval system 250 by communication link 295. In certain embodiments, communication link 295 comprises the internet.

Figure 2B:
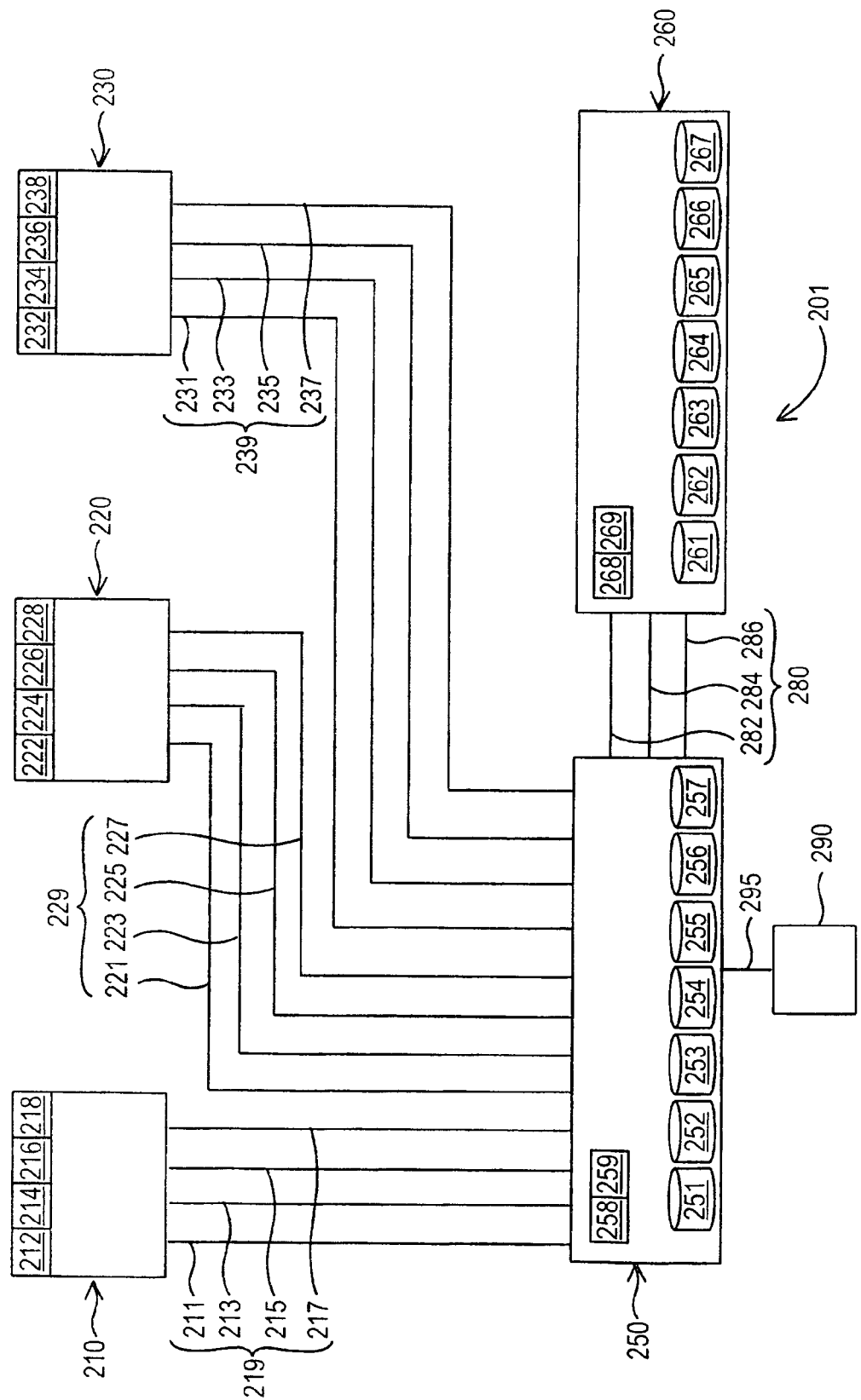

FIG. 2B shows another embodiment of Applicants' data processing system. In the illustrated embodiment of FIG. 2B, system 201 includes a first host computer 210, a second host computer 220, a third host computer 230, information storage and retrieval system 250, information storage and retrieval system 260, and configuration interface 290. Each of the first, second, and third host computers is interconnected with information storage and retrieval system 250.

In certain embodiments, Applicants' data processing system includes one or more host computers that communicate with information storage and retrieval system 250 via a SAN as illustrated in FIG. 2A, in combination with one or more host computers that communicate with information storage and retrieval system 250 directly as illustrated in FIG. 2B.

The illustrated embodiments of FIGS. 2A and 2B include three host computers. In other embodiments, Applicants' data processing systems 200/201 include two host computers. In other embodiments, Applicants' data processing systems 200/201 include more than three host computers.

Host computer 210 comprises a computer system, such as a mainframe, personal computer, workstation, and combinations thereof, including an operating system 212 such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 210 further includes a second operating system 218 such as, for example, Windows, AIX, Unix, MVS, LINUX, etc.

In certain embodiments, host computer 210 includes a storage management program 214. The storage management program 214 in the host computer 210 may include the functionality of storage management type programs known in the art that manage the transfer of data to a data storage and retrieval system, such as the IBM DFSMS implemented in the IBM MVS operating system.

Storage management program 214 may include known storage management program functions, such as recall and migration. The storage management program 214 may be implemented within the operating system 212 of the host computer 210 or as a separate, installed application program 216. Alternatively, storage management program 214 may include device drivers, backup software, application programs 216, and the like.

Host computer 220 comprises a computer system, such as a mainframe, personal computer, workstation, and combinations thereof, including an operating system 222 such as Windows, AIX, Unix, MVS, LINUX, etc. In certain embodiments, host computer 220 further includes a second operating system 228 such as, for example, Windows, AIX, Unix, MVS, LINUX, etc.

In certain embodiments, host computer 220 includes a storage management program 224. The storage management program 224 in the host computer 220 may include the functionality of storage management type programs known in the art that manage the transfer of data to a data storage and retrieval system, such as the IBM DFSMS implemented in the IBM MVS operating system.

Storage management program 224 may include known storage management program functions, such as recall and migration. The storage management program 224 may be implemented within the operating system 222 of the host computer 220 or as a separate, installed application program 226. Alternatively, storage management program 214 may include device drivers, backup software, application programs 226, and the like.

Host computer 230 comprises a computer system, such as a mainframe, personal computer, workstation, and combinations thereof, including an operating system 232 such as Windows, AIX, Unix, MVS, LINUX, etc. In certain embodiments, host computer 230 further includes a second operating system 238 such as, for example, Windows, AIX, Unix, MVS, LINUX, etc.

In certain embodiments, host computer 230 includes a storage management program 234. The storage management program 234 in the host computer 230 may include the functionality of storage management type programs known in the art that manage the transfer of data to a data storage and retrieval system, such as the IBM DFSMS implemented in the IBM MVS operating system.

Storage management program 234 may include known storage management program functions, such as recall and migration. The storage management program 234 may be implemented within the operating system 232 of the host computer 210 or as a separate, installed application program 236. Alternatively, storage management program 234 may include device drivers, backup software, application programs 236, and the like.

In the illustrated embodiment of FIG. 2A, host computer 210 is capable of communicating with SAN 240 via a plurality of communication links 219. In the illustrated embodiment of FIG. 2A, plurality of communication links 219 includes communication links 211, 213, 215, and 217. In other embodiments, host computer 210 is capable of communicating with SAN 240 via fewer than four communication links. In other embodiments, host computer 210 is capable of communicating with SAN 240 via more than four communication links. In certain embodiments, communication links 211, 213, 215, and 217, are each selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2A, host computer 220 is capable of communicating with SAN 240 via a plurality of communication links 229. In the illustrated embodiment of FIG. 2A, plurality of communication links 229 includes communication links 221, 223, 225, and 221. In other embodiments, host computer 220 is capable of communicating with SAN 240 via fewer than four communication links. In other embodiments, host computer 220 is capable of communicating with SAN 240 via more than four communication links. In certain embodiments, communication links 221, 223, 225, and 227, are each selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2A, host computer 230 is capable of communicating with SAN 240 via a plurality of communication links 239. In the illustrated embodiment of FIG. 2A, plurality of communication links 239 includes communication links 231, 233, 235, and 237. In other embodiments, host computer 230 is capable of communicating with SAN 240 via fewer than four communication links. In other embodiments, host computer 230 is capable of communicating with SAN 240 via more than four communication links. In certain embodiments, communication links 231, 233, 235, and 237, are each selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

SAN 240 comprises a storage area network, and in certain embodiments may include NASD 245. NASD 245 includes controller 246 and memory 247.

SAN 240 is capable of communicating with information storage and retrieval system 250 via a plurality of communication links 270. In the illustrated embodiment of FIG. 2A, plurality of communication links 270 includes communication links 272, 274, and 276. In other embodiments, plurality of communication links 270 includes fewer than three communication links. In other embodiments, plurality of communication links 270 includes more than three communication links. In certain embodiments, communication links 272, 274, and 276, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/internet Protocol (TCP/IP), the Internet, or other interconnections and/or protocols as is known to those of skill in the art.

In the illustrated embodiment of FIG. 2B, host computer 210 is capable of communicating with information storage and retrieval system 250 via a plurality of communication links 219. In the illustrated embodiment of FIG. 2B, plurality of communication links 219 includes communication links 211, 213, 215, and 217. In other embodiments, host computer 210 is capable of communicating with information storage and retrieval system 250 via fewer than four communication links. In other embodiments, host computer 210 is capable of communicating with information storage and retrieval system 250 via more than four communication links. In certain embodiments, communication links 211, 213, 215, and 217, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2B, host computer 220 is capable of communicating with information storage and retrieval system 250 via a plurality of communication links 229. In the illustrated embodiment of FIG. 2B, plurality of communication links 229 includes communication links 221, 223, 225, and 227. In other embodiments, host computer 210 is capable of communicating with information storage and retrieval system 250 via fewer than four communication links. In other embodiments, host computer 210 is capable of communicating with information storage and retrieval system 250 via more than four communication links. In certain embodiments, communication links 221, 223, 225, and 227, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2B, host computer 230 is capable of communicating with information storage and retrieval system 250 via a plurality of communication links 239. In the illustrated embodiment of FIG. 2B, plurality of communication links 239 includes communication links 231, 233, 235, and 237. In other embodiments, host computer 210 is capable of communicating with information storage and retrieval system 250 via fewer than four communication links. In other embodiments, host computer 210 is capable of communicating with information storage and retrieval system 250 via more than four communication links. In certain embodiments, communication links 231, 233, 235, and 237, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiments of FIGS. 2A and 2B, information storage and retrieval system 250 is shown further including logical volumes 251, 252, 253, 254, 255, 256, and 257. In other embodiments, information storage and retrieval system 250 comprises more than seven logical volumes.

Information storage and retrieval system 260 includes controller 268 and non-volatile memory 269. In the illustrated embodiments of FIGS. 2A and 2B, information storage and retrieval system 260 is shown further including logical volumes 261, 262, 263, 264, 265, 266, and 267. In other embodiments, information storage and retrieval system 260 comprises more than seven logical volumes.

Information storage and retrieval system 250 is capable of communicating with information storage and retrieval system 260 via a plurality of communication links 280. In the illustrated embodiments of FIGS. 2A and 2B, plurality of communication links 280 includes communication links 282, 284, and 286. In other embodiments, plurality of communication links 280 includes fewer than three communication links. In other embodiments, plurality of communication links 280 includes more than three communication links.

In certain embodiments, the logical volumes disposed in Applicants' information storage and retrieval system are written to one or more DASD devices. In certain embodiments, the logical volumes disposed in Applicants' information storage and retrieval system are written to one or more hard disks. In certain embodiments, the logical volumes disposed in Applicants' information storage and retrieval system are written to one or more hard disks, where those hard disks are configured in one or more hard disk arrays. In certain embodiments, the logical volumes disposed in information storage and retrieval system are written to one or more magnetic tapes.

In certain embodiments, Applicants' information storage and retrieval system 250 comprises an automated media library comprising a plurality of tape cartridges, one or more robotic accessors, and one or more tape drives. U.S. Pat. No. 5,970,030, assigned to the common assignee herein, describes such an automated media library and is hereby incorporated by reference. In certain embodiments, Applicants' information storage and retrieval system 250 comprises a virtual tape system. U.S. Pat. No. 6,269,423, assigned to the common assignee herein, describes such a virtual tape system, and is hereby incorporated by reference.

Figure 1:
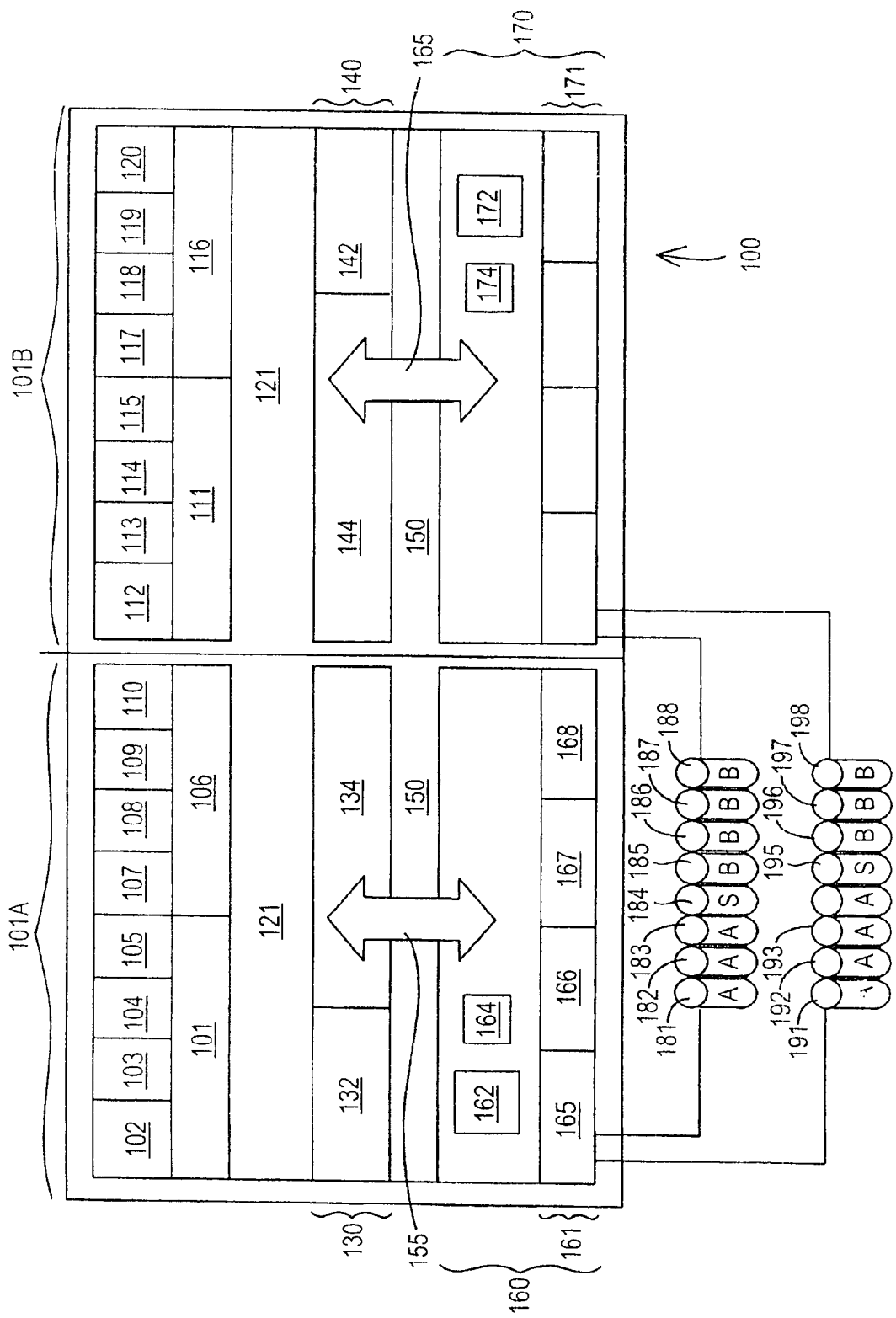
FIG. 1 is a block diagram showing the components of one embodiment of Applicants' information storage and retrieval system.

In certain embodiments, Applicants' information storage and retrieval system 250 comprises information storage and retrieval system 100 (FIG. 1).

Referring now to FIG. 1, Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102–105, 107–110, 112–115, and 117–120, disposed in four host bays 101, 106, 111, and 116. In certain embodiments, each host adapter may comprise one Fibre Channel port, one FICON port, two ESCON ports, or two SCSI ports. In other embodiments, information storage and retrieval system 100 includes other port types implementing other protocols known to those skilled in the art. Each host adapter is connected to both clusters through one or more Common Platform Interconnect buses 121 and 150 such that each cluster can handle I/O from any host adapter.

Processor portion 130 includes processor 132 and cache 134. Processor portion 140 includes processor 142 and cache 144. I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two disk arrays, namely array "A" and array "B". In certain embodiments, hard disk arrays "A" and "B" utilize a RAID protocol. As those skilled in the art will appreciate, a RAID (Redundant Array of Independent Disks) rank combines multiple inexpensive disk drives into an array of disk drives to obtain performance, capacity and reliability that exceeds that of a single large drive.

In certain embodiments, arrays "A" and "B" comprise what is sometimes called a JBOD array, i.e. "Just a Bunch Of Disks" where the array is not configured according to RAID. The illustrated embodiment of FIG. 1 shows two hard disk arrays. In other embodiments, Applicants' information storage and retrieval system includes more than two hard disk arrays.

Hard disk array "A" includes disk drives 181, 182, 183, 184, 191, 192, and 193. Hard disk array "B" includes disk drives 185, 186, 187, 188, 195, 196, 197, and 198. In the illustrated embodiment of FIG. 1, each loop includes at least two spare disks, namely disks 184 and 195. Each of the hard disk arrays includes one of those spare disks.

Referring again to FIG. 2, in certain embodiments, host computer 210 is owned by a first person. In certain embodiments, host computer 220 is owned by a second person. In certain embodiments, host computer 230 is owned by a third person. In certain embodiments, two or more of the first person, the second person, and/or the third person, differ. As those skilled in the art will appreciate, it is desirable to limit access by, for example, the first person to only logical volumes comprising information owned by that first person. Similarly, it is desirable to limit access by the second person and by the third person to logical volumes comprising information owned by that second person or third person, respectively.

In certain embodiments, the storage system which includes storage area network 240 and information storage and retrieval system 250 are owned by a fourth person. In certain embodiments, that fourth person differs from the first person, the second person, and/or the third person. In order to limit the access by the first person, and/or the second person, and/or the third person, to some but not all the logical volumes disposed in information storage and retrieval system 250, the fourth person must implement an apparatus and method to control access to the logical volumes disposed in information storage and retrieval system 250. This is particularly true when data processing system 200 is capable of using parallel access volumes.

Applicants' invention includes a method to control access to logical volumes disposed in an information storage and retrieval system when using parallel access volumes ("PAV"). A parallel access volume consists of a base logical volume and an associated logical alias. In certain embodiments, alias, and hence the number of PAVs, to be assigned to each base device is determined by the parallel access volume's configuration application at IPL time or at the time a base device is varied online. In certain embodiments, the parallel access volume configuration application comprises an ESS Specialist algorithm.

Figure 5A:
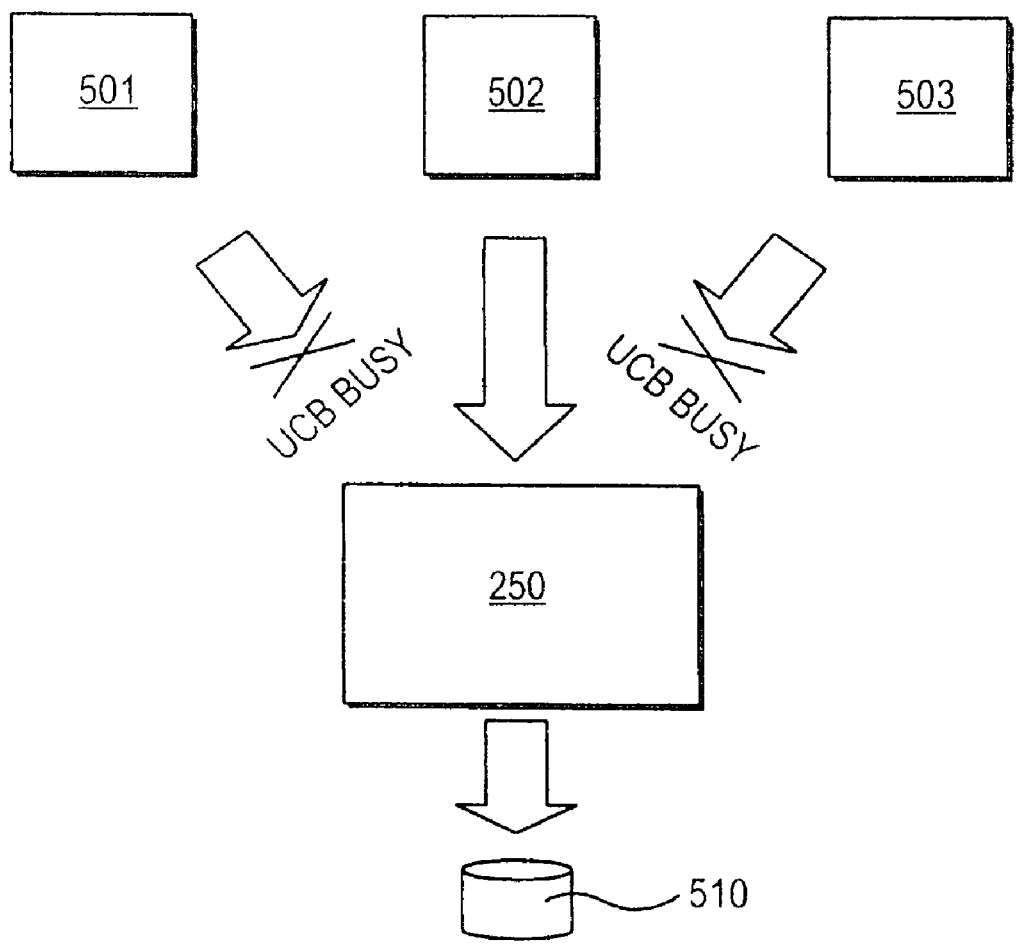
FIG. 5A is a block diagram showing multiple host computer applications successfully attempting to access the same logical volume.

The PAV feature of Applicants' information storage and retrieval system allows alias devices to be assigned to base logical volumes to increase the parallelism of I/O requests to the base logical volume. For example and referring now to FIG. 5A, host computer applications 501, 502, and 503, are running on one host computer, such as for example host computer 210 (FIG. 2). That host computer has access rights to logical volume 510. In the illustrated embodiment of FIG. 5A, application 502 is executing I/O operations using logical volume 510. Applications 501 and 503 have requested access to logical volume 510. The operating system in host computer 210 determines, however, that UCB 510 is busy. The operating system then blocks the access requests of applications 501 and 503, and those requests are queued for later processing.

Figure 5B:
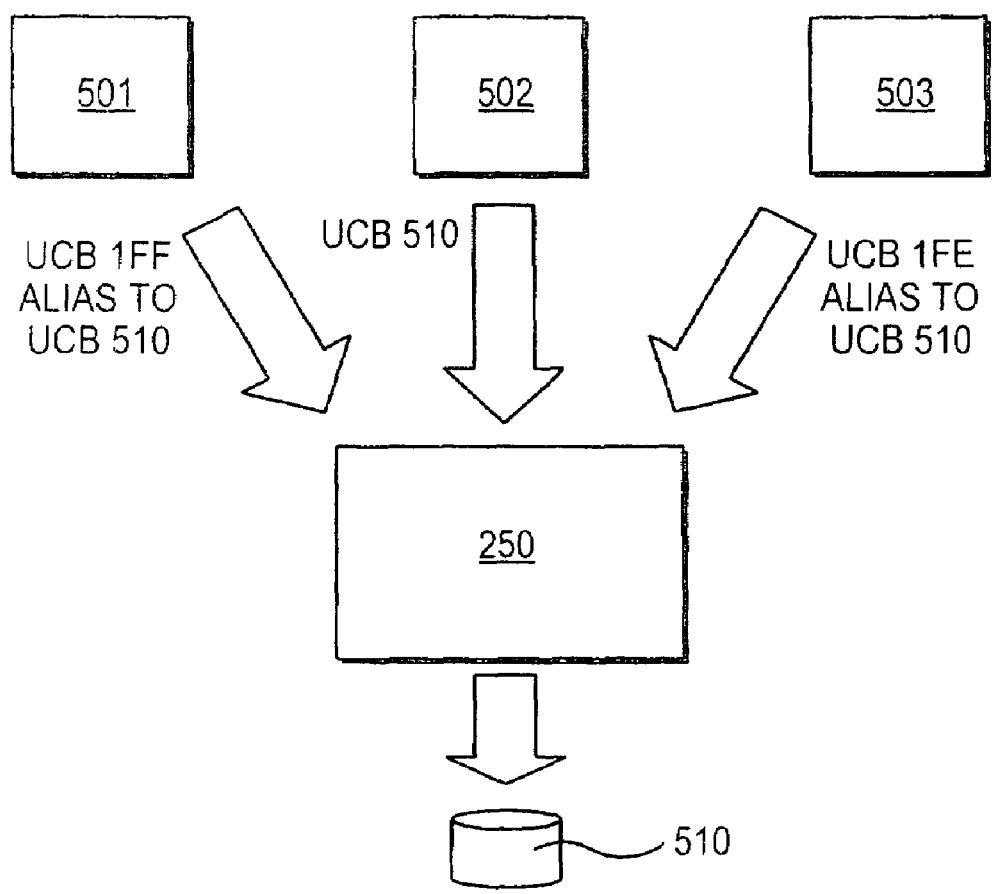
FIG. 5B is a block diagram showing multiple host computer applications successfully accessing the same logical volume by using parallel access volumes.

In the illustrated embodiment of FIG. 5B, application 502 is performing I/O operations with logical volume 510. At the same time, application 501 is performing I/O operations with logical volume 510. Because UCB 510 is busy, the I/O operations for application 501 are steered by the host computer operating system to UCB 1FF and logical volume 1FF, where logical volume 1FF does not actually exist. Rather, logical volume 1FF is a PAV with logical volume 510 comprising the base logical volume for that PAV.

At the same time, application 503 is performing I/O operations with logical volume 510, Because UCB 510 is busy, the I/O operations for application 503 are steered by the host computer operating system to UCB 1FE and logical volume 1FE, where logical volume 1FE does not actually exist. Rather, logical volume 1FE is a PAV with logical volume 510 comprising the base logical volume for that PAV.

If only two PAVs, i.e. PAVs 1FF and 1FE are assigned to logical volume 510, and if a fourth application running on host computer 210 requests simultaneous access rights to logical volume 510, the operating system in host computer 210 can either queue that request for later processing, or move another alias to point at base logical volume 510. In certain embodiments, the Work Load Manager and Input/Output Supervisor elements of a host computer, such as host computer 210, 220, and/or 230, are capable of automatically managing alias. Using these functions, a host computer can autonomically reassign alias to meet workload demands. Applicants' method to control access to logical volumes disposed in an information storage and retrieval system using PAVs determines the base logical volume associated with a requested PAV. If that base logical volume is assigned to the (k)th logical volume group, and if the requesting host computer is assigned to the (k)th host computer group, then Applicants' method permits the requesting host computer to access the base logical volume via the requested PAV.

Figure 3:
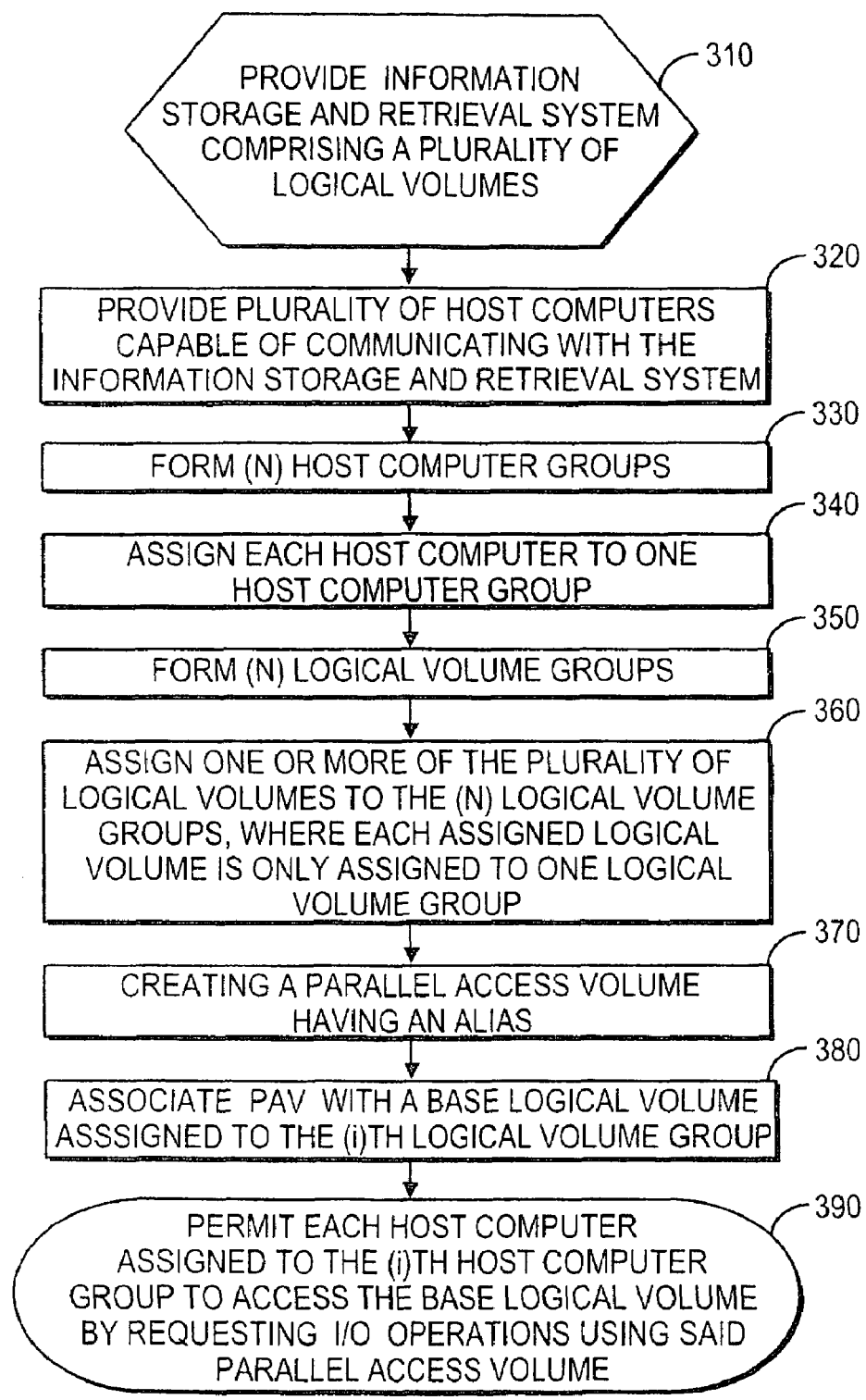
FIG. 3 is a flow chart summarizing the initial steps of Applicants' method.

FIG. 3 summarizes the initial steps in Applicants' method. Referring now to FIG. 3, in step 310 Applicants' method provides an information storage and retrieval system, such as system 250 (FIG. 2), where that information storage and retrieval system includes a plurality of logical volumes, such as plurality of logical volumes 262, 264, 266, 268, 272, 274, 276.

In step 320, Applicant's method provides a plurality of host computers, such as host computer 210, 220, 230, where each of those host computers are capable of communicating with the information storage and retrieval system.

In step 330, Applicant's method forms (N) host computer groups, where (N) is equal to or greater than 1. In certain embodiments, one or more of those host computer groups includes one host computer. In certain embodiments, one or more of those host computer groups includes two or more host computers. In certain embodiments, step 330 is performed by a storage system owner and/or operator, such as the owner and/or operator of information storage and retrieval system 250 (FIG. 2). In certain embodiments, step 330 is performed by a controller, such as controller 252, disposed in Applicants' information storage and retrieval system.

In step 340, Applicants' method assigns each host computer capable of communicating with the information storage and retrieval system to one of the (N) host computer groups, such that an assigned host computer is only assigned to one of the (N) host computer groups. In certain embodiments, step 340 is performed by a storage system owner and/or operator, such as the owner and/or operator of information storage and retrieval system 250 (FIG. 2). In certain embodiments, step 340 is performed by a controller, such as controller 252, disposed in Applicants' information storage and retrieval system.

In step 350, Applicant's method forms (N) logical volume groups. In certain embodiments, step 350 is performed by a storage system owner and/or operator, such as the owner and/or operator of information storage and retrieval system 250 (FIG. 2). In certain embodiments, step 350 is performed by a controller, such as controller 252, disposed in Applicants' information storage and retrieval system.

In step 360, Applicants' method assigns one or more of the plurality of logical volumes of step 310 to one or more of the (N) logical volume groups of step 350, such that each assigned logical volume is assigned to a single logical volume group. In certain embodiments, step 360 is performed by a storage system owner and/or operator, such as the owner and/or operator of information storage and retrieval system 250 (FIG. 2). In certain embodiments, step 360 is performed by a controller, such as controller 252, disposed in Applicants' information storage and retrieval system. In the event one or more logical volumes are not assigned to any of the (N) logical volumes groups, then those volumes remain "unassigned."

In step 370, Applicants' method creates a parallel access volume ("PAV") comprising an alias. In certain embodiments, step 370 is performed by a storage system owner and/or operator, such as the owner and/or operator of information storage and retrieval system 250 (FIG. 2). In certain embodiments, step 370 is performed by a controller, such as controller 252, disposed in Applicants' information storage and retrieval system.

In step 380, Applicants' method associates the PAV and alias of step 370 to an original base logical volume. If the alias for the PAV is not later reassigned to a different base logical volume, then the PAV's current base logical volume remains the original base logical volume. The association of the PAV and alias of step 370 to an original base logical volume is a persistent relationship which survives subsequent changes to the configuration of the PAV and/or alias and/or base logical volume. For example, even if the alias is reassigned to a different base logical volume, which then becomes the current base logical volume, the relationship between the PAV and the original base logical volume persists.

In step 390, Applicants' method permits each host computer assigned to the (i)th host computer group to direct I/O operations to the current base logical volume associated with the PAV of step 380 if that current base logical volume is assigned to the (i)th logical volume group.

Figure 4:
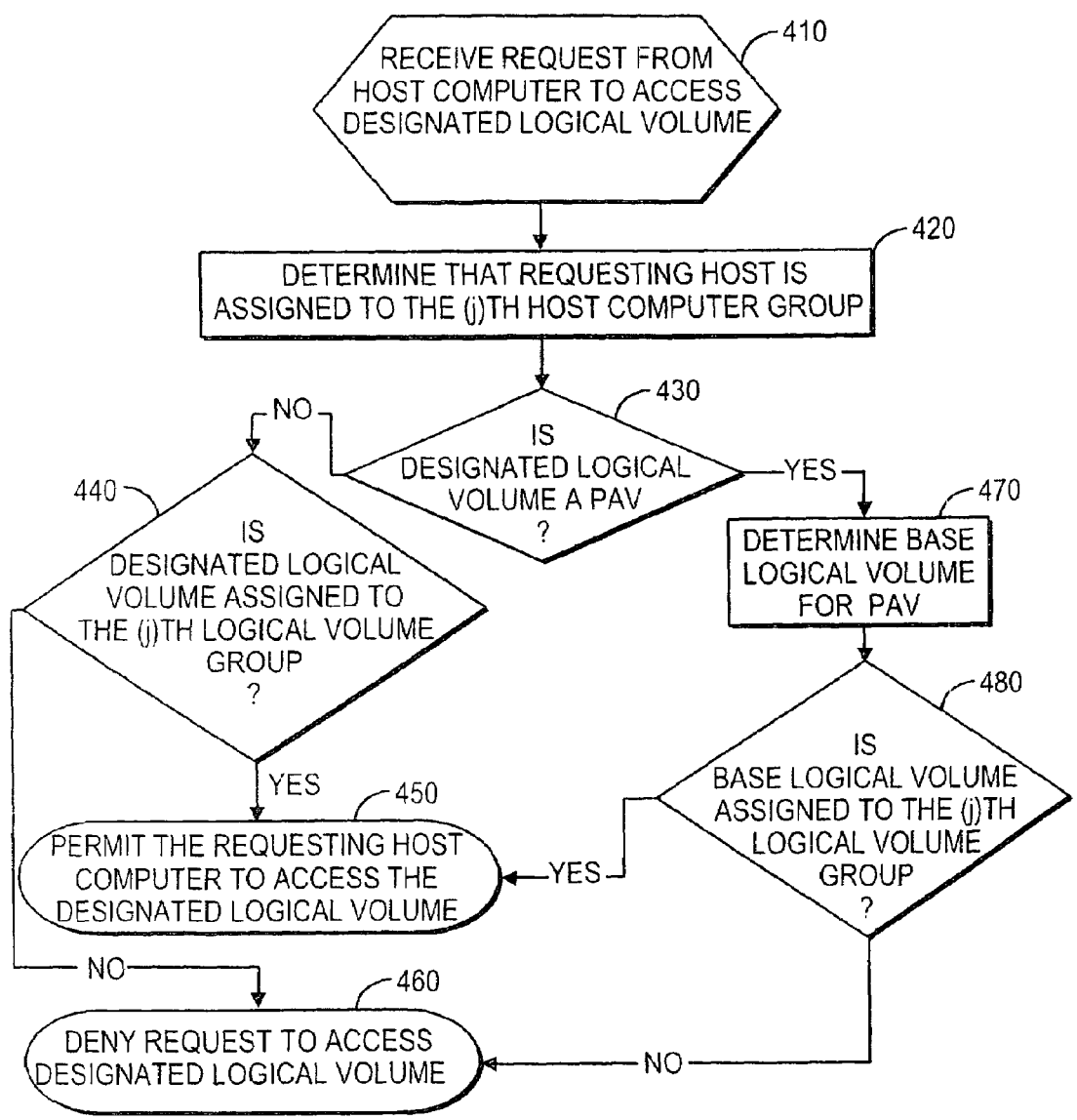
FIG. 4 is a flow chart summarizing certain additional steps of Applicants' method.

Referring now to FIG. 4, in step 410 Applicants' information storage and retrieval system, such as system 200 (FIG. 2), receives a request from an interconnected host computer, such as host computer 210 (FIG. 2), to access a designated logical volume, where the designated logical volume could be a PAV associated with a base logical volume.

In step 420, Applicants' method determines that the requesting host is assigned to the (j)th host computer group, wherein (j) is greater than or equal to 1 and less than or equal to (N). In certain embodiments, step 420 is performed by a controller, such as controller 252 (FIG. 2), disposed in Applicants' information storage and retrieval system, such as system 250 (FIG. 2).

Applicant's method transitions from step 420 to step 430 wherein the method determines if the designated volume is a parallel access volume. In certain embodiments, step 430 is performed by a controller, such as controller 252 (FIG. 2), disposed in Applicants' information storage and retrieval system, such as system 250 (FIG. 2). In certain embodiments, step 430 is performed by a NASD, such as NASD 245, interconnected to a storage area network, such as SAN 240.

If Applicants' method determines in step 430 that the designated logical volume is not a PAV, then the method transitions from step 430 to step 440 wherein the method determines if the designated logical volume of step 410 is assigned to the (j)th logical volume group. In certain embodiments, step 440 is performed by a controller, such as controller 252 (FIG. 2), disposed in Applicants' information storage and retrieval system, such as system 250 (FIG. 2).

If Applicants' method determines in step 440 that the designated logical volume of step 410 is assigned to the (j)th logical volume group, then the method transitions from step 440 to step 450 wherein the method permits the requesting host computer, assigned to the (j)th host computer group, to access the designated logical volume which is assigned to the (j)th logical volume group. Alternatively, if Applicants' method determines in step 440 that the designated logical volume of step 410 is not assigned to the (j)th logical volume group, then the method transitions from step 440 to step to step 460 wherein the method does not permit the requesting host computer, assigned to the (j)th host computer group, to access the designated logical volume which is not assigned to the (j)th logical volume group.

If Applicant's method determines in step 430 that the designated logical volume is a PAV, then the method transitions from step 430 to step 470 wherein the method determines the current base logical volume associated with the designated PAV of step 410. In certain embodiments, step 470 is performed by a controller, such as controller 252 (FIG. 2), disposed in Applicants' information storage and retrieval system, such as system 250 (FIG. 2). In certain embodiments, step 470 is performed by a NASD, such as NASD 245, interconnected to a storage area network, such as SAN 240.

Applicants' method transitions from step 470 to step 480 wherein the method determines if the current base logical volume identified in step 470 is assigned to the (j)th logical volume group. In certain embodiments, step 480 is performed by a controller, such as controller 252 (FIG. 2), disposed in Applicants' information storage and retrieval system, such as system 250 (FIG. 2).

If Applicants' method determines in step 480 that the current base logical volume identified in step 470 is assigned to the (j)th logical volume group, then the method transitions from step 470 to step 450 wherein the method permits the requesting host computer, assigned to the (j)th host computer group, to access the current base logical volume identified in step 470 which is assigned to the (j)th logical volume group. Alternatively, if Applicants' method determines in step 480 that the base logical volume identified in step 470 is not assigned to the (j)th logical volume group, then the method transitions from step 480 to step to step 460 wherein the method does not permit the requesting host computer, assigned to the (j)th host computer group, to access the current base logical volume identified in step 470 which is not assigned to the (j)th logical volume group.

Figure 6:
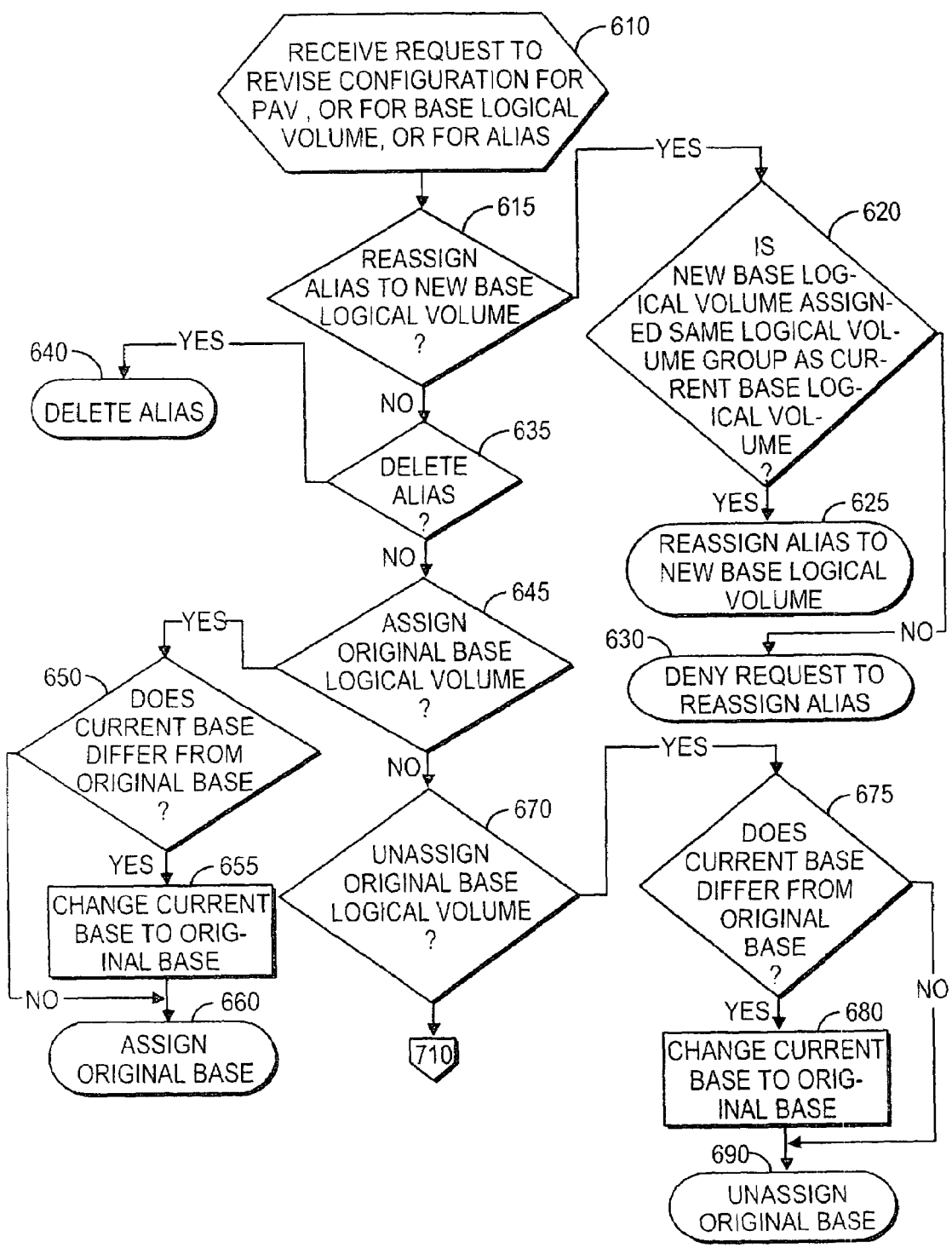
FIG. 6 is a flow chart summarizing certain additional steps of Applicants' method.
Figure 7:
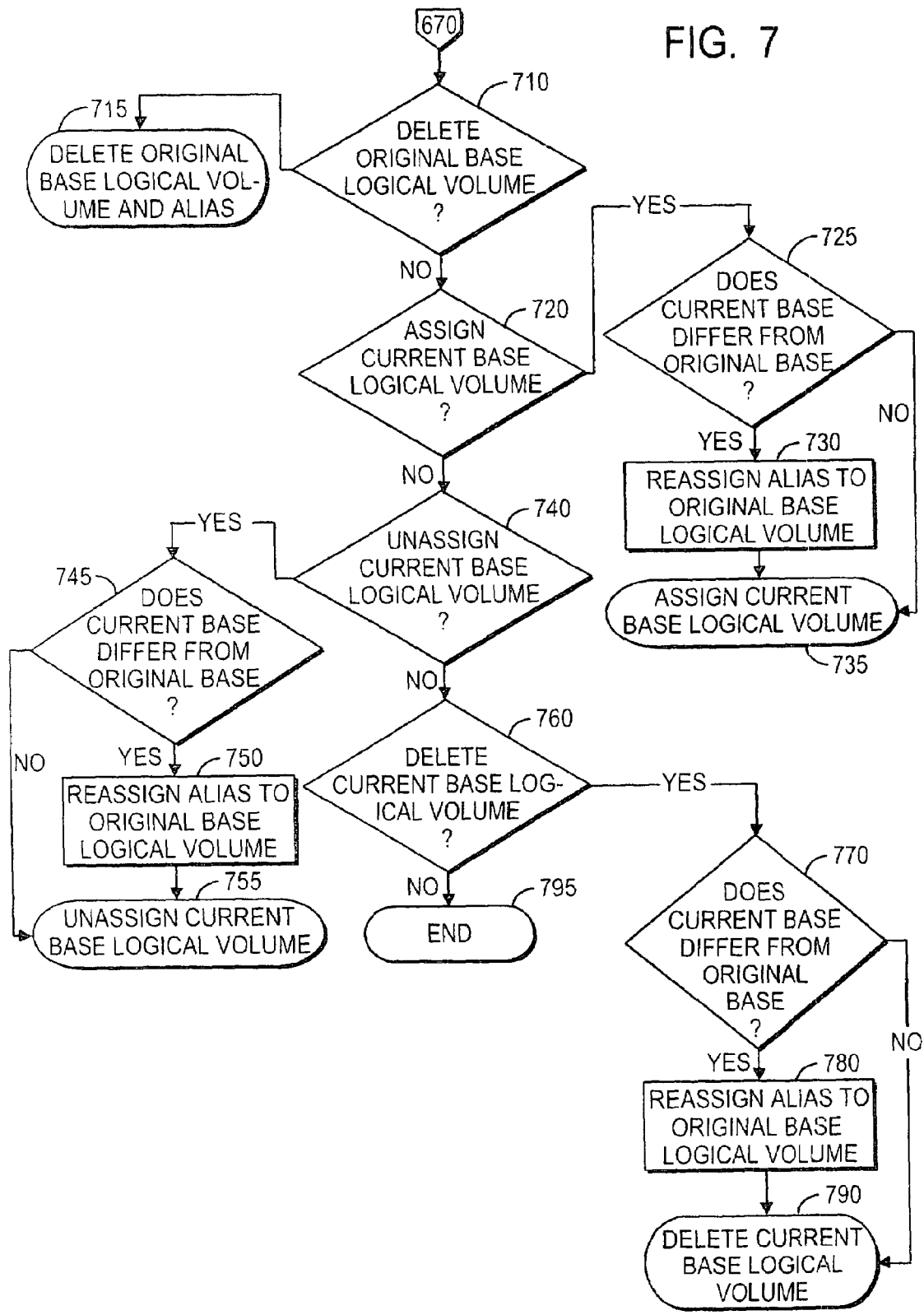
FIG. 7 is a flow chart summarizing certain additional steps of Applicants' method.

FIGS. 6 and 7 summarize the steps of Applicants' method to assign, unassign, or delete an original base logical volume or a current base logical volume, and/or to reassign or delete an alias.

Referring now to FIG. 6, in step 610 Applicants' information storage and retrieval system receives a request to assign, unassign, or delete an original base logical volume or a current base logical volume, and/or to reassign or delete an alias. In step 615, Applicants' information storage and retrieval system determines if the request comprises reassigning an alias to a new base logical volume. In certain embodiments, step 615 is performed by a controller, such as controller 252 (FIG. 2), disposed in Applicants' information storage and retrieval system, such as system 250 (FIG. 2).

If Applicants' information storage and retrieval system determines in step 615 that the request comprises reassigning an alias to a new base logical volume, then Applicants' method transitions from step 615 to step 620 wherein the method determines if the proposed new base logical volume is assigned to the same logical volume group as the current base logical volume. In certain embodiments, step 615 is performed by a controller, such as controller 252 (FIG. 2), disposed in Applicants' information storage and retrieval system, such as system 250 (FIG. 2).

If Applicants' information storage and retrieval system determines in step 620 that the proposed new base logical volume is assigned to the same logical volume group as the current base logical volume, then the method transitions from step 620 to step 625 wherein the method reassigns the alias to the new base logical volume. In certain embodiments, step 625 is performed by a controller, such as controller 252 (FIG. 2), disposed in Applicants' information storage and retrieval system, such as system 250 (FIG. 2).

Alternatively, if Applicants' information storage and retrieval system determines in step 620 that the proposed new base logical volume is not assigned to the same logical volume group as the original base logical volume, then the method transitions from step 620 to step 630 wherein the method denies the request to reassign the alias. In certain embodiments, step 630 is performed by a controller, such as controller 252 (FIG. 2), disposed in Applicants' information storage and retrieval system, such as system 250 (FIG. 2).

If Applicants' information storage and retrieval system determines in step 615 that the request does not comprise reassigning an alias, then the method transitions from step 615 to step 635 wherein the method determines if the request comprises deleting the alias. In certain embodiments, step 635 is performed by a controller such as controller 252 (FIG. 2), disposed in Applicants' information storage and retrieval system, such as system 250 (FIG. 2). If Applicants' information storage and retrieval system determines in step 635 that the request comprises deleting an alias, then the method transitions from step 635 to step 640 wherein the method deletes that alias. In certain embodiments, step 640 is performed by a controller, such as controller 252 (FIG. 2), disposed in Applicants' information storage and retrieval system, such as system 250 (FIG. 2).

If Applicant's information storage and retrieval system determines in step 635 that the request does not comprise deleting an alias, then the method transitions from step 635 to step 645 wherein the information storage and retrieval system determines if the request comprises assigning an original base logical volume associated with a PAV. In certain embodiments, step 645 is performed by a controller, such as controller 252 (FIG. 2), disposed in Applicants' information storage and retrieval system, such as system 250 (FIG. 2). If Applicants' information storage and retrieval system determines in step 645 that the request comprises assigning the original base logical volume to a logical volume group, then the method transitions from step 645 to step 650 wherein the information storage and retrieval system determines if the current base logical volume differs from the original base logical volume. In certain embodiments, step 650 is performed by a controller, such as controller 252 (FIG. 2), disposed in Applicants' information storage and retrieval system, such as system 250 (FIG. 2).

If Applicants' information storage and retrieval system determines in step 650 that the current base logical volume does not differ from the original base logical volume, then the method transitions from step 650 to step 660 wherein the method assigns the original base logical volume. In certain embodiments, step 660 is performed by a controller, such as controller 252 (FIG. 2), disposed in Applicants' information storage and retrieval system, such as system 250 (FIG. 2). Alternatively, if Applicants' information storage and retrieval system determines in step 650 that the current base differs from the original base, then the method transitions from step 650 to step 655 wherein the information storage and retrieval system changes the current base logical volume to the original base logical volume. In certain embodiments, step 655 is performed by a controller, such as controller 252 (FIG. 2), disposed in Applicants' information storage and retrieval system, such as system 250 (FIG. 2). Applicants' method transitions from step 655 to step 660.

If Applicants' information storage and retrieval system determines in step 645 that the request does not comprise assigning an original base logical volume, then the method transitions from step 645 to step 670 wherein the information storage and retrieval system determines if the request comprises unassigning an original base logical volume, associated with a PAV, from a logical volume group. In certain embodiments, step 670 is performed by a controller, such as controller 252 (FIG. 2), disposed in Applicants' information storage and retrieval system, such as system 250 (FIG. 2).

If Applicants' information storage and retrieval system determines in step 670 that the request comprises unassigning an original base logical group associated with a PAV, then the method transitions from step 670 to step 675 wherein the information storage and retrieval system determines if the current base logical volume associated with that PAV differs from the original base logical volume. In certain embodiments, step 675 is performed by a controller, such as controller 252 (FIG. 2), disposed in Applicants' information storage and retrieval system, such as system 250 (FIG. 2).

If Applicants' information storage and retrieval system determines in step 675 that the current base does not differ from the original base logical volume, then the method transitions from step 675 to step 690 wherein the method unassigns the original base logical volume from a previously-assigned logical volume group. In certain embodiments, step 690 is performed by a controller, such as controller 252 (FIG. 2), disposed in Applicants' information storage and retrieval system, such as system 250 (FIG. 2). Alternatively, if Applicants' information storage and retrieval system determines in step 675 that the current base differs from the original base, then the method transitions from step 675 to step 680 wherein the information storage and retrieval system changes the current base logical volume to the original base logical volume. In certain embodiments, step 680 is performed by a controller, such as controller 252 (FIG. 2), disposed in Applicants' information storage and retrieval system, such as system 250 (FIG. 2). Applicants' method transitions from step 680 to step 690 wherein the method unassigns the original base logical volume from a previously-assigned logical volume group.

If Applicants' information storage and retrieval system determines in step 670 that the request does not comprise unassigning an original base logical volume, then the method transitions from step 670 to step 710 (FIG. 7) wherein the information storage and retrieval system determines if the request of step 610 comprises deleting an original base logical volume associated with a PAV. In certain embodiments, step 710 is performed by a controller, such as controller 252 (FIG. 2), disposed in Applicants' information storage and retrieval system, such as system 250 (FIG. 2). If Applicants' method determines in step 710 that the request comprises deleting an original base logical volume, then the method transitions from step 710 to step 715 wherein the information storage and retrieval system deletes the original base logical volume associated with a PAV and the PAV's alias. In certain embodiments, step 715 is performed by a controller, such as controller 252 (FIG. 2), disposed in Applicant's information storage and retrieval system, such as system 250 (FIG. 2).

If Applicants' information storage and retrieval system determines in step 710 that the request of step 610 does not comprise deleting an original base logical volume, then the method transitions from step 710 to step 720 wherein the information storage and retrieval system determines if the request of step 610 comprises assigning a current base logical volume associated with a PAV. In certain embodiments, step 720 is performed by a controller, such as controller 252 (FIG. 2), disposed in Applicants' information storage and retrieval system, such as system 250 (FIG. 2). If the information storage and retrieval system determines in step 720 that the request comprises assigning the current base logical volume associated with a PAV, then the method transitions from step 720 to step 725 wherein the information storage and retrieval system determines if the current base logical volume associated with the PAV differs from the original base logical volume. In certain embodiments, step 725 is performed by a controller, such as controller 252 (FIG. 2), disposed in Applicants' information storage and retrieval system, such as system 250 (FIG. 2).

If Applicants' information storage and retrieval system determines in step 725 that the current base logical volume differs from the original base logical volume, then the method transitions from step 725 to step 730 wherein the information storage and retrieval system reassigns the PAV's alias to the original base logical volume. In certain embodiments, step 680 is performed by a controller, such as controller 252 (FIG. 2), disposed in Applicants' information storage and retrieval system, such as system 250 (FIG. 2). Applicant's method transitions from step 730 to step 735 wherein the information storage and retrieval system assigns the current base logical volume to one of the (N) logical volume groups. In certain embodiments, step 735 is performed by a controller, such as controller 252 (FIG. 2), disposed in Applicants' information storage and retrieval system, such as system 250 (FIG. 2). If Applicants' information storage and retrieval system determines in step 725 that the current base logical volume does not differ from the original base logical volume, then the method transitions from step 725 to step 735.

If Applicants' information storage and retrieval system determines in step 720 that the request of step 610 does not comprise assigning a current base logical volume, then the method transitions from step 720 to step 740 wherein the information storage and retrieval system determines if the request of step 610 comprises unassigning a current base logical volume associated with a PAV. In certain embodiments, step 740 is performed by a controller, such as controller 252 (FIG. 2), disposed in Applicants' information storage and retrieval system, such as system 250 (FIG. 2). If the information storage and retrieval system determines in step 740 that the request comprises unassigning a current base logical volume, then the method transitions from step 740 to step 745 wherein the information storage and retrieval system determines if the current base logical volume associated with the PAV differs from the original base logical volume. In certain embodiments, step 745 is performed by a controller, such as controller 252 (FIG. 2), disposed in Applicants' information storage and retrieval system, such as system 250 (FIG. 2).

If Applicant's information storage and retrieval system determines in step 745 that the current base logical volume differs from the original base logical volume, then the method transitions from step 745 to step 750 wherein the information storage and retrieval system reassigns the PAV's alias to the original base logical volume. In certain embodiments, step 750 is performed by a controller, such as controller 252 (FIG. 2), disposed in Applicants' information storage and retrieval system, such as system 250 (FIG. 2). Applicants' method transitions from step 750 to step 755 wherein the information storage and retrieval system unassigns the current base logical volume. In certain embodiments, step 735 is performed by a controller, such as controller 252 (FIG. 2), disposed in Applicants' information storage and retrieval system, such as system 250 (FIG. 2). If Applicants' information storage and retrieval system determines in step 745 that the current base logical volume does not differ from the original base logical volume, then the method transitions from step 745 to step 755.

If Applicants' information storage and retrieval system determines in step 740 that the request of step 610 does not comprise unassigning an original base logical volume associated with a PAV, then the method transitions from step 740 to step 760 wherein the information storage and retrieval system determines if the request of step 610 comprises deleting a current base logical volume associated with a PAV. In certain embodiments, step 760 is performed by a controller, such as controller 252 (FIG. 2), disposed in Applicants' information storage and retrieval system, such as system 250 (FIG. 2). If the information storage and retrieval system determines in step 760 that the request comprises deleting the current base logical volume, then the method transitions from step 760 to step 770 wherein the information storage and retrieval system determines if the current base logical volume differs from the original base logical volume associated with the PAV. In certain embodiments, step 770 is performed by a controller, such as controller 252 (FIG. 2), disposed in Applicants' information storage and retrieval system, such as system 250 (FIG. 2).

If Applicants' information storage and retrieval system determines in step 770 that the current base logical volume differs from the original base logical volume, then the method transitions from step 770 to step 780 wherein the information storage and retrieval system reassigns the PAV's alias to the original base logical volume. In certain embodiments, step 780 is performed by a controller, such as controller 252 (FIG. 2), disposed in Applicants' information storage and retrieval system, such as system 250 (FIG. 2). Applicants' method transitions from step 780 to step 790 wherein the information storage and retrieval system deletes the current base logical volume. In certain embodiments, step 790 is performed by a controller, such as controller 252 (FIG. 2), disposed in Applicants' information storage and retrieval system, such as system 250 (FIG. 2). If Applicants' information storage and retrieval system determines in step 760 that the current base logical volume does not differ from the original base logical volume, then the method transitions from step 770 to step 790. If Applicants' method determines in step 760 that the request does not comprise deleting a current base logical volume, then the method transitions from step 760 to step 795 and ends.

The embodiments of Applicant's method recited in FIGS. 3, 4, 6, and/or 7, may be implemented separately. Moreover, in certain embodiments, individual steps recited in FIGS. 3, 4, 6, and/or 7, may be combined, eliminated, or reordered.

In certain embodiments, Applicants' invention includes instructions residing in non-volatile memory 254 (FIG. 2), where those instructions are executed by controller 252 (FIG. 2) to performs steps 330, 340, 350, 360, 370, 380, and 390, recited in FIG. 3, steps 410 through 480 recited in FIG. 4, steps 610 through 690 recited in FIG. 6, and/or steps 710 through 795 recited in FIG. 7. In other embodiments, Applicants' invention includes instructions residing in any other computer program product, where those instructions are executed by a computer external to, or internal to, system 200, to perform steps 330, 340, 350, 360, 370, 380, and 390, recited in FIG. 3, steps 410 through 480 recited in FIG. 4, steps 610 through 690 recited in FIG. 6, and/or steps 710 through 795 recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to control access to logical volumes disposed in an information storage and retrieval system using parallel access volumes, comprising the steps of:
   providing an information storage and retrieval system comprising a plurality of logical volumes;
   providing a plurality of host computers, wherein each of said plurality of host computers is capable of communicating with said information storage and retrieval system;
   forming (N) host computer groups, wherein (N) is greater than or equal to 1;
   assigning each host computer to the a host computer group;
   forming (N) logical volume groups;
   assigning one or more of said plurality of logical volumes to a logical volume group;
   creating a parallel access volume having an alias;
   persistently associating said parallel access volume with a base logical volume, wherein said base logical volume is assigned to the (i)th logical volume group, wherein (i) is greater than or equal to 1 and less than or equal to (N);
   permitting each host computer assigned to the (i)th host computer group to access said parallel access volume;
   receiving a request to assign to a logical volume group the base logical volume associated with a parallel access volume;
   determining if the base logical volume associated with said parallel access volume differs from the original base logical volume associated with said parallel access volume;
   operative if the base logical volume associated with said parallel access volume does not differ from the original base logical volume associated with said parallel access volume, assigning the base logical volume associated with said parallel access volume to said logical volume group;
   operative if the base logical volume associated with said parallel access volume differs from the original base logical volume associated with said parallel access volume:
   reassigning the alias for said parallel access volume to said original base logical volume; and
   assigning to said logical volume group said base logical volume associated with said parallel access volume.

2. A method to control access to logical volumes disposed in an information storage and retrieval system using parallel access volumes, comprising the steps of:
   providing an information storage and retrieval system comprising a plurality of logical volumes;
   providing a plurality of host computers, wherein each of said plurality of host computers is capable of communicating with said information storage and retrieval system;
   forming (N) host computer groups, wherein (N) is greater than or equal to 1;
   assigning each host computer to the a host computer group;
   forming (N) logical volume groups;
   assigning one or more of said plurality of logical volumes to a logical volume group;
   creating a parallel access volume having an alias;

persistently associating said parallel access volume with a base logical volume, wherein said base logical volume is assigned to the (i)th logical volume group, wherein (i) is greater than or equal to 1 and less than or equal to (N);

permitting each host computer assigned to the (i)th host computer group to access said parallel access volume, receiving a request to unassign from a logical volume group the base logical volume associated with a parallel access volume;

determining if the base logical volume associated with said parallel access volume differs from the original base logical volume associated with said parallel access volume;

operative if the base logical volume associated with said parallel access volume does not differ from the original base logical volume associated with said parallel access volume, unassigning from said logical volume group said base logical volume associated with said parallel access volume;

operative if the base logical volume associated with said parallel access volume differs from the original base logical volume associated with said parallel access volume:

reassigning the alias associated with said parallel access volume to said original base logical volume associated with said parallel access volume;

unassigning from said logical volume group the base logical volume associated with said parallel access volume.

3. A method to control access to logical volumes disposed in an information storage and retrieval system using parallel access volumes, comprising the steps of:

providing an information storage and retrieval system comprising a plurality of logical volumes;

providing a plurality of host computers, wherein each of said plurality of host computers is capable of communicating with said information storage and retrieval system;

forming (N) host computer groups, wherein (N) is greater than or to 1;

assigning each host computer to the a host computer group;

forming (N) logical volume groups;

assigning one or more of said plurality of logical volumes to a logical volume group;

creating a parallel access volume having an alias;

persistently associating said parallel access volume with a base logical volume, wherein said base logical volume is assigned to the (i)th logical volume group, wherein (i) is greater than or equal to 1 and less than or equal to (N);

permitting each host computer assigned to the (i)th host computer group to access said parallel access volume.

receiving a request to delete the base logical volume associated with a parallel access volume;

determining if the base logical volume associated with said parallel access volume differs from the original base logical volume associated with said parallel access volume;

operative if the base logical volume associated with said parallel access volume does not differ from the original base logical volume associated with said parallel access volume, deleting the base logical volume associated with said parallel access volume;

operative if the base logical volume associated with said parallel access volume differs from the original base logical volume:

reassigning said alias associated with said parallel access volume to said original base logical volume associated with said parallel access volume;

deleting the base logical volume associated with said parallel access volume.

4. An article of manufacture comprising a computer readable medium having computer readable program code disposed therein to control access to logical volumes disposed in an information storage and retrieval system using parallel access volumes, wherein said information storage and retrieval system comprises a plurality of logical volumes, and wherein a plurality of host computers are capable of communicating with said information storage and retrieval system, and wherein one or more of said logical volumes are assigned to one of (N) logical volume groups wherein (N) is greater than or equal to 1, and wherein each host computer is assigned to one of (N) host computer groups, the computer readable program code comprising a series of computer readable program steps to effect:

receiving a request from one of said plurality of host computers to access a designated logical volume, wherein said requesting host is assigned to the (j)th host computer group;

determining if said designated logical volume is a parallel access volume comprising an alias;

operative if said designated logical volume is a parallel access volume, determining if the base logical volume persistently associated with said parallel access volume is assigned to the (j)th logical volume group;

operative if the base logical volume persistently associated with said parallel access volume is assigned to the (j)th logical volume group, permitting said requesting host computer to access said designated logical volume;

receiving a request to assign to a logical volume group the base logical volume associated with a parallel access volume;

determining if the base logical volume associated with said parallel access volume differs from the original base logical volume associated with said parallel access volume;

operative if the base logical volume associated with said parallel access volume does not differ from the original base logical volume associated with said parallel access volume, assigning the base logical volume associated with said parallel access volume to said logical volume group;

operative if the base logical volume associated with said parallel access volume differs from the original base logical volume associated with said parallel access volume:

reassigning the alias for said parallel access volume to said original base logical volume; and assigning to said logical volume group said base logical volume associated with said parallel access volume.

5. An article of manufacture comprising a computer readable medium having computer readable program code disposed therein to control access to logical volumes disposed in an information storage and retrieval system using parallel access volumes, wherein said information storage and retrieval system comprises a plurality of logical volumes, and wherein a plurality of host computers are capable of communicating with said information storage and retrieval system, and wherein one or more of said logical volumes are assigned to one of (N) logical volume groups wherein (N) is greater than or equal to 1, and wherein each host computer is assigned to one of (N) host computer groups, the computer readable program code comprising a series of computer readable program steps to effect:

receiving a request from one of said plurality of host computers to access a designated logical volume, wherein said requesting host is assigned to the (j)th host computer group;

determining if said designated logical volume is a parallel access volume comprising an alias;

operative if said designated logical volume is a parallel access volume, determining if the base logical volume persistently associated with said parallel access volume is assigned to the (j)th logical volume group;

operative if the base logical volume persistently associated with said parallel access volume is assigned to the (j)th logical volume group, permitting said requesting host computer to access said designated logical volume;

receiving a request to unassign from a logical volume group the base logical volume associated with a parallel access volume;

determining if the base logical volume associated with said parallel access volume differs from the original base logical volume associated with said parallel access volume;

operative if the base logical volume associated with said parallel access volume does not differ from the original base logical volume associated with said parallel access volume, unassigning from said logical volume group said base logical volume associated with said parallel access volume;

operative if the base logical volume associated with said parallel access volume differs from the original base logical volume associated with said parallel access volume:

reassigning the alias associated with said parallel access volume to said original base logical volume associated with said parallel access volume;

unassigning from said logical volume group the base logical volume associated with said parallel access volume.

6. An article of manufacture comprising a computer readable medium having computer readable program code disposed therein to control access to logical volumes disposed in an information storage and retrieval system using parallel access volumes, wherein said information storage and retrieval system comprises a plurality of logical volumes, and wherein a plurality of host computers are capable of communicating with said information storage and retrieval system, and wherein one or more of said logical volumes are assigned to one of (N) logical volume groups wherein (N) is greater than or equal to 1, and wherein each host computer is assigned to one of (N) host computer groups, the computer readable program code comprising a series of computer readable program steps to effect:

receiving a request from one of said plurality of host computers to access a designated logical volume, wherein said requesting host is assigned to the (j)th host computer group;

determining if said designated logical volume is a parallel access volume comprising an alias;

operative if said designated logical volume is a parallel access volume, determining if the base logical volume persistently associated with said parallel access volume is assigned to the (j)th logical volume group;

operative if the base logical volume persistently associated with said parallel access volume is assigned to the (j)th logical volume group, permitting said requesting host computer to access said designated logical volume;

receiving a request to delete the base logical volume associated with a parallel access volume;

determining if the base logical volume associated with said parallel access volume differs from the original base logical volume associated with said parallel access volume;

operative if the base logical volume associated with said parallel access volume does not differ from the original base logical volume associated with said parallel access volume, deleting the base logical volume associated with said parallel access volume;

operative if the base logical volume associated with said parallel access volume differs from the original base logical volume:

reassigning said alias associated with said parallel access volume to said original base logical volume associated with said parallel access volume;

deleting the base logical volume associated with said parallel access volume.

7. A computer program product embodied in a computer readable medium, said computer program product usable with a programmable computer processor to control access to logical volumes disposed in an information storage and retrieval system using parallel access volumes, wherein said information storage and retrieval system comprises a plurality of logical volumes, and wherein a plurality of host computers are capable of communicating with said information storage and retrieval system, and wherein one or more of said logical volumes are assigned to one of (N) logical volume groups wherein (N) is greater than or equal to 1, and wherein each host computer is assigned to one of (N) host computer groups, comprising:

computer readable program code which causes said programmable computer processor to receive a request from one of said plurality of host computers to access a designated logical volume, wherein said requesting host is assigned to the (j)th host computer group;

computer readable program code which causes said programmable computer processor to determine if said designated logical volume is a parallel access volume comprising an alias, wherein said parallel access volume is persistently associated with an original base logical volume, and wherein said plurality of logical volumes includes said original base logical volume;

computer readable program code which, if said designated logical volume is a parallel access volume, causes said programmable computer processor to determine the base logical volume associated with said parallel access volume;

computer readable program code which causes said programmable computer processor to determine if said base logical volume is assigned to the (i)th logical volume group;

computer readable program code which, if said base logical volume is assigned to the (j)th logical volume group, causes said programmable computer processor to permit said requesting host computer to access said base logical volume;

computer readable program code which, if said base logical volume is not assigned to the (j)th logical volume group, causes said programmable computer processor to disallow access by said requesting host computer to said base logical volume;

computer readable program code which causes said programmable computer processor to receive a request to assign to a logical volume group the current base logical volume associated with a parallel access volume;

computer readable program code which causes said programmable computer processor to determine if the base logical volume associated with said parallel access volume differs from the original base logical volume associated with said parallel access volume;

computer readable program code which, if the base logical volume associated with said parallel access volume does not differ from the original base logical volume associated with said parallel access volume, causes said programmable computer processor to assign the base logical volume associated with said parallel access volume to said logical volume group;

computer readable program code which, if the base logical volume associated with said parallel access volume differs from the original base logical volume associated with said parallel access volume, causes said programmable computer processor to:

reassign the alias for said parallel access volume to said original base logical volume; and assign to said logical volume group said base logical volume associated with said parallel access volume.

8. A computer program product embodied in a computer readable medium, said computer program product usable with a programmable computer processor to control access to logical volumes disposed in an information storage and retrieval system using parallel access volumes, wherein said information storage and retrieval system comprises a plurality of logical volumes, and wherein a plurality of host computers are capable of communicating with said information storage and retrieval system, and wherein one or more of said logical volumes are assigned to one of (N) logical volume groups wherein (N) is greater than or equal to 1, and wherein each host computer is assigned to one of (N) host computer groups, comprising:

computer readable program code which causes said programmable computer processor to receive a request from one of said plurality of host computers to access a designated logical volume, wherein said requesting host is assigned to the (j)th host computer group;

computer readable program code which causes said programmable computer processor to determine if said designated logical volume is a parallel access volume comprising an alias, wherein said parallel access volume is persistently associated with an original base logical volume, and wherein said plurality of logical volumes includes said original base logical volume;

computer readable program code which, if said designated logical volume is a parallel access volume, causes said programmable computer processor to determine the base logical volume associated with said parallel access volume;

computer readable program code which causes said programmable computer processor to determine if said base logical volume is assigned to the (j)th logical volume group;

computer readable program code which, if said base logical volume is assigned to the (j)th logical volume group, causes said programmable computer processor to permit said requesting host computer to access said base logical volume;

computer readable program code which, if said base logical volume is not assigned to the (j)th logical volume group, causes said programmable computer processor to disallow access by said requesting host computer to said base logical volume;

computer readable program code which causes said programmable computer processor to receive a request to unassign from a logical volume group the current base logical volume associated with a parallel access volume;

computer readable program code which causes said programmable computer processor to determine if the current base logical volume associated with said parallel access volume differs from the original base logical volume associated with said parallel access volume;

computer readable program code which, if the base logical volume associated with said parallel access volume does not differ from the original base logical volume associated with said parallel access volume, causes said programmable computer processor to unassign from said logical volume group said base logical volume associated with said parallel access volume;

computer readable program code which, if the base logical volume associated with said parallel access volume differs from the original base logical volume associated with said parallel access volume, causes said programmable computer processor to:

reassign the alias associated with said parallel access volume to said original base logical volume associated with said parallel access volume;

unassigning from said logical volume group the base logical volume associated with said parallel access volume.

9. A computer program product embodied in a computer readable medium, said computer program product usable with a programmable computer processor to control access to logical volumes disposed in an information storage and retrieval system using parallel access volumes, wherein said information storage and retrieval system comprises a plurality of logical volumes, and wherein a plurality of host computers are capable of communicating with said information storage and retrieval system, and wherein one or more of said logical volumes are assigned to one of (N) logical volume groups wherein (N) is greater than or equal to 1, and wherein each host computer is assigned to one of (N) host computer groups, comprising:

computer readable program code which causes said programmable computer processor to receive a request from one of said plurality of host computers to access a designated logical volume, wherein said requesting host is assigned to the (j)th host computer group;

computer readable program code which causes said programmable computer processor to determine if said designated logical volume is a parallel access volume comprising an alias, wherein said parallel access volume is persistently associated with an original base logical volume, and wherein said plurality of logical volumes includes said original base logical volume;

computer readable program code which, if said designated logical volume is a parallel access volume, causes said programmable computer processor to determine the base logical volume associated with said parallel access volume;

computer readable program code which causes said programmable computer processor to determine if said base logical volume is assigned to the (j)th logical volume group;

computer readable program code which, if said base logical volume is assigned to the (j)th logical volume group, causes said programmable computer processor to permit said requesting host computer to access said base logical volume;

computer readable program code which, if said base logical volume is not assigned to the (j)th logical volume group, causes said programmable computer processor to disallow access by said requesting host computer to said base logical volume;

computer readable program code which causes said programmable computer processor to receive a request to delete the base logical volume associated with a parallel access volume;

computer readable program code which causes said programmable computer processor to determine if the base logical volume associated with said parallel access volume differs from the original base logical volume associated with said parallel access volume;

computer readable program code which, if the base logical volume associated with said parallel access volume does not differ from the original base logical volume associated with said parallel access volume, causes said programmable computer processor to delete the base logical volume associated with said parallel access volume;

computer readable program code which, if the base logical volume associated with said parallel access volume differs from the original base logical volume, causes said programmable computer processor to:

reassign said alias associated with said parallel access volume to said original base logical volume associated with said parallel access volume;

delete the base logical volume associated with said parallel access volume.

* * * * *